United States Patent
Yun et al.

(10) Patent No.: US 7,899,601 B2
(45) Date of Patent: Mar. 1, 2011

(54) METHODOLOGY FOR EXTENDING THE HIGH LOAD LIMIT OF HCCI OPERATION BY ADJUSTING INJECTION TIMING AND SPARK TIMING

(75) Inventors: Hanho Yun, Oakland Township, MI (US); Nicole Wermuth, Ann Arbor, MI (US); Paul M. Najt, Bloomfield Hills, MI (US); Jun-Mo Kang, Ann Arbor, MI (US); Gunter Gräwert, Erzhausen (DE)

(73) Assignee: GM Global Technology Operations LLC, Detroit, MI (US)

( * ) Notice: Subject to any disclaimer, the term of this patent is extended or adjusted under 35 U.S.C. 154(b) by 71 days.

(21) Appl. No.: 12/395,747

(22) Filed: Mar. 2, 2009

(65) Prior Publication Data
US 2010/0222985 A1    Sep. 2, 2010

(51) Int. Cl.
G06F 17/00 (2006.01)
F02D 19/00 (2006.01)
F02B 7/08 (2006.01)

(52) U.S. Cl. .......... 701/103; 701/108; 123/295; 123/435
(58) Field of Classification Search .......... 701/101–105, 701/108, 110–111, 113–115; 123/295, 305, 123/406.45, 406.47, 406.48, 431, 435, 436, 123/478, 480
See application file for complete search history.

(56) References Cited

U.S. PATENT DOCUMENTS

| | | | | |
|---|---|---|---|---|
| 6,647,935 | B2 * | 11/2003 | Aoyama et al. | 123/90.16 |
| 7,121,254 | B2 * | 10/2006 | Wickman et al. | 123/304 |
| 7,128,046 | B1 * | 10/2006 | Dec et al. | 123/295 |
| 7,412,322 | B1 | 8/2008 | Rask et al. | |
| 7,421,999 | B2 * | 9/2008 | Kim et al. | 123/295 |
| 7,469,181 | B2 * | 12/2008 | Duffy et al. | 701/108 |
| 2005/0279093 | A1 * | 12/2005 | Wang et al. | 60/599 |
| 2007/0033939 | A1 * | 2/2007 | Wang et al. | 60/612 |
| 2008/0271688 | A1 * | 11/2008 | Wermuth et al. | 123/90.16 |
| 2009/0205612 | A1 | 8/2009 | Wermuth et al. | |
| 2009/0272362 | A1 | 11/2009 | Yun et al. | |
| 2010/0031924 | A1 * | 2/2010 | Sun et al. | 123/435 |

OTHER PUBLICATIONS

U.S. Appl. No. 12/408,816, Yun et al.

* cited by examiner

*Primary Examiner* — Stephen K Cronin
*Assistant Examiner* — Johnny H Hoang

(57) ABSTRACT

A method for operating an internal combustion engine including extended operation in a homogeneous charge compression ignition mode at high loads includes operating the engine in the homogeneous charge compression ignition mode including spark-assisted ignition, monitoring an engine load, monitoring an engine speed, determining the engine to be in a high ringing range based upon the engine load and the engine speed, and when the engine load is in the high ringing range, operating the engine in a reduced ringing mode. The reduced ringing mode includes modulating a fuel injection timing according to a calibrated maximum combustion chamber cooling fuel injection timing, determining a preferred combustion phasing value, and modulating a spark timing based upon the modulated fuel injection timing and the preferred combustion phasing value.

14 Claims, 7 Drawing Sheets

METHODOLOGY FOR EXTENDING THE HIGH LOAD LIMIT OF HCCI OPERATION BY ADJUSTING INJECTION TIMING AND SPARK TIMING

TECHNICAL FIELD

This invention relates to internal combustion engines, and more specifically to controlling operation thereof.

BACKGROUND

The statements in this section merely provide background information related to the present disclosure and may not constitute prior art.

Internal combustion engines, especially automotive internal combustion engines, generally fall into one of two categories, spark ignition engines and compression ignition engines. Traditional spark ignition engines, such as gasoline engines, typically function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke, which ignites upon injection. Combustion for both traditional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. One of these combustion concepts is known in the art as the homogeneous charge compression ignition (HCCI). The HCCI combustion mode comprises a distributed, flameless, auto-ignition combustion process that is controlled by oxidation chemistry, rather than by fluid mechanics. In a typical engine operating in HCCI combustion mode, the cylinder charge is nearly homogeneous in composition, temperature, and residual level at intake valve closing time. The typical engine operating in the HCCI combustion mode can further operate using stratified charge fuel injection to control and modify the combustion process, including using stratified charge combustion to trigger the HCCI combustion. Because auto-ignition is a distributed kinetically-controlled combustion process, the engine operates at a very dilute fuel/air mixture (i.e., lean of a fuel/air stoichiometric point) and has a relatively low peak combustion temperature, thus forming extremely low nitrous oxides (NOx) emissions. The fuel/air mixture for auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the auto-ignition combustion mode can operate unthrottled to achieve diesel-like fuel economy. The HCCI engine can operate at stoichiometry with substantial amounts of exhaust gas recirculation (EGR) to achieve effective combustion.

At medium engine speeds and loads, a combination of valve profile and timing (e.g., exhaust recompression and exhaust re-breathing) and fueling strategy has been found to be effective in providing adequate thermal energy to the cylinder charge so that auto-ignition during the compression stroke leads to stable combustion with low noise. One of the main issues in effectively operating an engine in the auto-ignition combustion mode has been to control the combustion process properly so that robust and stable combustion resulting in low emissions, optimal heat release rate, and low noise can be achieved over a range of operating conditions. The benefits of auto-ignition combustion have been known for many years. The primary barrier to product implementation, however, has been the inability to control the auto-ignition combustion process, i.e., combustion phasing and rate of combustion. Late phasing or very slow combustion will result in partial burns and even possibly misfires. Too early phasing or too rapid combustion will lead to knock.

There is no direct control of start of combustion for an engine operating in the auto-ignition mode, as the chemical kinetics of the cylinder charge determine the start and course of the combustion. Chemical kinetics are sensitive to temperature and, as such, the controlled auto-ignition combustion process is sensitive to temperature. An important variable affecting the combustion initiation and progress is the effective temperature of the cylinder structure, i.e., temperature of cylinder walls, head, valve, and piston crown. Additionally, spark-assisted ignition is known to facilitate combustion in certain operating ranges.

Operation within an HCCI mode at higher loads is problematic, as energy present within the combustion chamber increases with increasing load. This increasing energy, exhibited for example by higher temperatures within the air fuel charge being combusted, increases likelihood of the air fuel charge combusting before the intended combustion point, resulting in an undesirable pressure wave or ringing from the combustion chamber.

SUMMARY

A method for controlling an internal combustion engine capable of operating in a homogeneous charge compression ignition mode, including extended operation in the homogeneous charge compression ignition mode at high loads by reducing occurrence of ringing within the engine includes operating the engine in the homogeneous charge compression ignition mode including spark-assisted ignition, monitoring an engine load, monitoring an engine speed and determining when the engine is in a high ringing range based upon the engine load and the engine speed. When the engine load is in the high ringing range the engine is operated in a reduced ringing mode, including modulating a fuel injection timing according to a calibrated maximum combustion chamber cooling fuel injection timing, determining a preferred combustion phasing value, and modulating a spark timing based upon the modulated fuel injection timing and the preferred combustion phasing value.

BRIEF DESCRIPTION OF THE DRAWINGS

One or more embodiments will now be described, by way of example, with reference to the accompanying drawings, in which.

DETAILED DESCRIPTION

Figure 1:
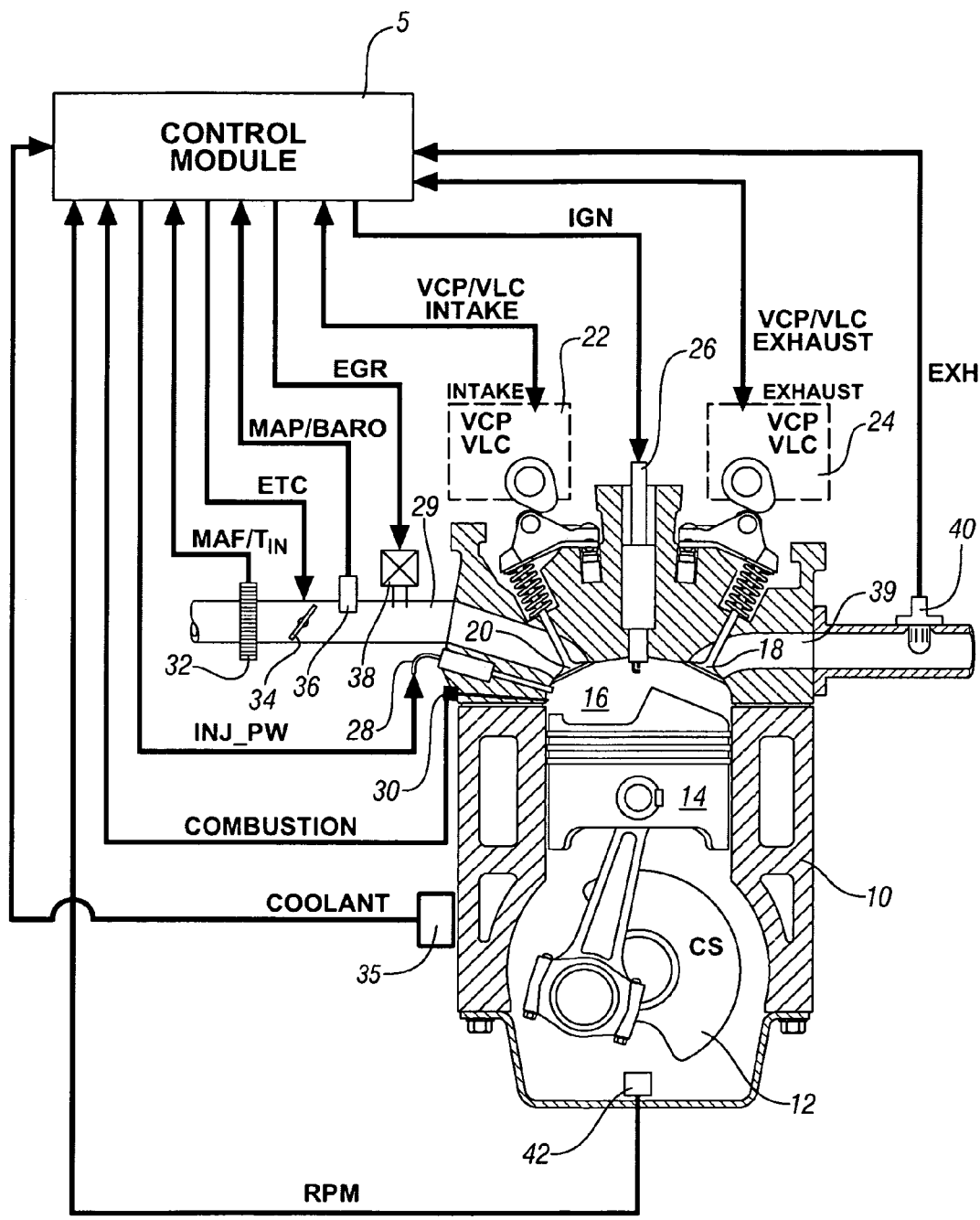
FIG. 1 schematically depicts an exemplary engine system, in accordance with the present disclosure.

Referring now to the drawings, wherein the showings are for the purpose of illustrating certain exemplary embodiments only and not for the purpose of limiting the same, FIG. 1 depicts a schematic diagram of an internal combustion engine 10 and accompanying control module 5 that have been constructed in accordance with an embodiment of the invention.

The exemplary engine 10 comprises a multi-cylinder direct-injection four-stroke internal combustion engine having reciprocating pistons 14 slidably movable in cylinders which define variable volume combustion chambers 16. Each of the pistons is connected to a rotating crankshaft 12 (CS) by which their linear reciprocating motion is translated to rotational motion. There is an air intake system which provides intake air to an intake manifold which directs and distributes the air into an intake runner 29 to each combustion chamber 16. The air intake system comprises airflow ductwork and devices for monitoring and controlling the air flow. The devices preferably include a mass airflow sensor 32 for monitoring mass airflow (MAF) and intake air temperature ($T_{IN}$). Throttle valve 34, preferably an electronically controlled device, controls air flow to the engine in response to a control signal (ETC) from the control module. Pressure sensor 36 in the manifold is adapted to monitor manifold absolute pressure (MAP) and barometric pressure (BARO). External flow passage, including a flow control valve (exhaust gas recirculation (EGR) valve 38), recirculates exhaust gases from engine exhaust to the intake manifold. The control module 5 is operative to control mass flow of exhaust gas to the engine air intake by controlling opening of the EGR valve. As used herein, the term 'cylinder structure' refers to the engine components and elements which form each combustion chamber, i.e., walls of cylinder, piston, and head, including intake and exhaust valves.

Air flow from the intake runner 29 into each of the combustion chambers 16 is controlled by one or more intake valves 20. Flow of combusted gases from each of the combustion chambers to an exhaust manifold via exhaust runners 39 is controlled by one or more exhaust valves 18. Openings and closings of the intake and exhaust valves are preferably controlled with a dual camshaft (as depicted), the rotations of which are linked and indexed with rotation of the crankshaft 12. The engine is equipped with devices for controlling phasing, lift and duration of openings of the intake and the exhaust valves, preferably using variable lift control (VLC) and variable cam phasing (VCP) systems. The variable valve lift system comprises devices operative to control valve lift, or opening, to one of two distinct steps, e.g., a low-lift valve opening (about 3-6 mm) for low speed, low load operation, and a high-lift valve opening (about 8-10 mm) for high speed and high load operation. Alternatively, a continuously variable lift mechanism can be used to provide added control flexibility. The VCP systems are operable to shift valve opening and closing times relative to crankshaft and piston position, i.e., phasing, beyond that which is effected by the two-step VLC lift. There is a VCP/VLC system 22 for the engine intake and a VCP/VLC system 24 for the engine exhaust. The VCP/VLC systems 22, 24 are controlled by the control module 5, and provide signal feedback to the control module consisting of camshaft rotation position for the intake camshaft and the exhaust camshaft. When the engine is operating in an auto-ignition mode with exhaust recompression valve strategy the low lift operation is typically used, and when the engine is operating in a spark-ignition combustion mode the high lift operation typically is used.

VCP/VLC systems have a limited range of authority over which opening and closings of the intake and exhaust valves can be controlled. The typical VCP system has a range of phasing authority of 30°-90° of cam shaft rotation, thus permitting the control system to advance or retard opening and closing of the engine valves. The range of phasing authority is defined and limited by the hardware of the VCP and the control system which actuates the VCP. The VCP/VLC system is actuated using one of electro-hydraulic, hydraulic, and electric control force, controlled by the control module 5.

The engine includes a fuel injection system, comprising a plurality of high-pressure fuel injectors 28 each adapted to directly inject a mass of fuel into one of the combustion chambers, in response to an engine control signal (INJ_PW) from the control module. The fuel injectors 28 are supplied pressurized fuel from a fuel distribution system (not shown).

The engine includes a spark ignition system by which spark energy is provided to a spark plug 26 for igniting or assisting in igniting cylinder charges in each of the combustion chambers, in response to an engine control signal (IGN) from the control module. The spark plug 26 enhances the ignition timing control of the engine at certain conditions (e.g., during cold start, near a low load operation limit, and during ordinary SI engine combustion operation).

The engine is equipped with various sensing devices for monitoring engine operating states, including a crankshaft rotational speed sensor 42 having output RPM, a sensor 30 adapted to monitor combustion having output (COMBUSTION), and a sensor 40 adapted to monitor exhaust gases having output (EXH), typically a wide range air/fuel ratio sensor, and a coolant sensor 35 having output (COOLANT). The combustion sensor comprises a sensor device operative to monitor a combustion parameter and is depicted as a cylinder pressure sensor to monitor in-cylinder combustion pressure. It is understood that other sensing systems used to monitor cylinder pressure or another combustion parameter which can be translated into combustion phasing are included within the scope of the invention, e.g., ion-sense ignition systems.

The engine is designed to operate un-throttled on gasoline or similar fuel blends with auto-ignition combustion ('HCCI combustion') over an extended range of engine speeds and loads. The engine operates in spark ignition combustion mode with controlled throttle operation with conventional or modified control methods under conditions not conducive to the HCCI combustion mode operation and to attain maximum engine power to meet an operator torque request (To_req). Widely available grades of gasoline and light ethanol blends thereof are preferred fuels; however, alternative liquid and gaseous fuels such as higher ethanol blends (e.g. E80, E85), neat ethanol (E99), neat methanol (M100), butanol gasoline blends, neat butanol, natural gas, hydrogen, biogas, various reformates, syngases, and others may be used in the implementation of the present invention.

The control module 5 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the desired functions. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event such as a specific crank angle location.

The control module 5 executes algorithmic code stored therein to control the aforementioned actuators to specific control states to control the engine operation, including: throttle position (ETC); spark timing and dwell (IGN); fuel injection mass and timing (INJ_PW); phasing, lift and duration of openings of the intake and/or exhaust valves (VCP/VLC); and, EGR valve position (EGR) to control flow of recirculated exhaust gases. The phasing, lift and duration of openings of the intake and/or exhaust valves includes negative valve overlap (NVO in an exhaust recompression strategy) and lift of exhaust valve reopening (in an exhaust re-breathing strategy). The control module is adapted to monitor input signals from the operator (e.g., an accelerator pedal position and a brake pedal position) to determine the operator torque request (To_req), and adapted to monitor engine operating states from sensors, including those indicating engine speed (RPM), engine load (using MAF, MAP, or INJ_PW), coolant temperature (COOLANT), intake air temperature ($T_{IN}$), and other ambient conditions, to determine an engine operating point, primarily related to engine speed and load.

The control module 5 operates to determine control states for various engine actuators, including the engine valve actuation phasing, lift, duration (VCP/VLC Intake, VCP/VLC Exhaust), fuel injection timing and pulsewidth (INJ_PW) including multiple injections per cycle, spark timing and dwell (IGN), EGR valve position (EGR), and throttle position (ETC), from predetermined lookup tables and equations stored in memory, as will be described hereinafter. The control module is operative to monitor torque or load and engine speed from which engine power is calculated.

The control module further monitors engine operating states to compensate for effects of transient engine operation on the effective temperature of the cylinder structure. The intent of monitoring the engine operating states is to determine a parameter which correlates to a difference between a steady-state temperature of the cylinder structure and the effective temperature of the cylinder structure during the transient engine operation, which affects auto-ignition combustion timing and rate of combustion.

The control module monitors the engine operating states to determine and quantify an aggregate or cumulative engine power, i.e., an engine power history comprising recent engine operation and power output. The difference between current engine power and engine power history correlates to the difference between a steady-state temperature of the cylinder structure at the current operating condition of speed and load and the effective temperature of the cylinder structure during the transient engine operation, as is known to a person having ordinary skill in the art.

The state of the engine power history is preferably determined by ongoingly monitoring one or more engine operating states which are correlatable to engine power, and accumulating the monitored states. In one embodiment, accumulating the monitored states comprises inputting the states to a moving average equation which uses an elapsed time-period for averaging. The elapsed time-period for averaging is determined based upon the thermal capacity of the cylinder structure, typically in the form of a heat-transfer time-constant. In another embodiment, accumulating the monitored states comprises inputting the states to a weighted moving average equation which uses the elapsed time-period for averaging, with preferential weighting given to the most-recently monitored states. One monitored engine state which is usable as a surrogate for the engine power history comprises engine fuel flow, based upon the INJ_PW command and engine speed to calculate instantaneous injector flow (INJ_FLO) from which can be determined an average fuel flow (INJ_AVG). Other methods for monitoring and determining the effective temperature of the cylinder structure during the transient engine operation and a state for the engine power history are included in so far as they fall within the scope of the invention.

Figure 2:
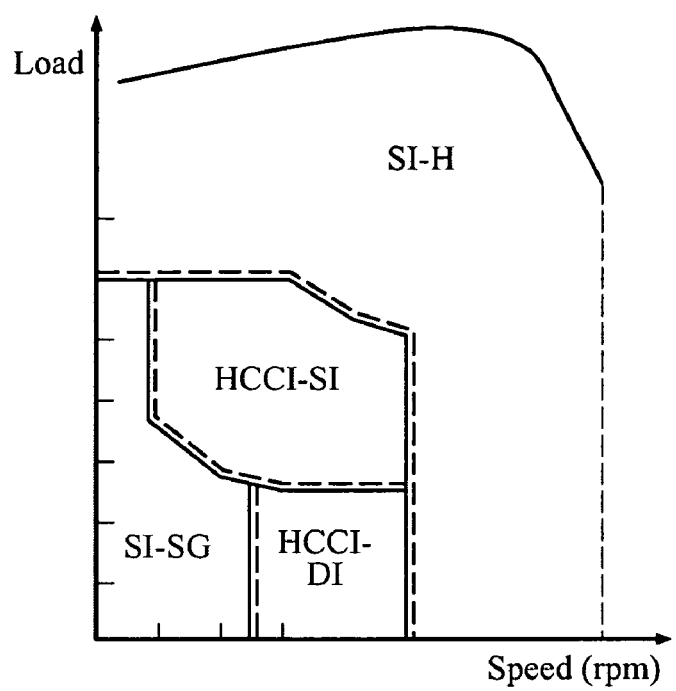
FIG. 2 graphically depicts various modes of engine operation preferred according to engine speed and engine load, in accordance with the present disclosure.

Referring now to FIG. 2, the exemplary engine is selectively operative in one of a plurality combustion modes, based upon engine operating states, in this embodiment comprising speed (RPM) and engine load, which is derivable from engine operating parameters such as injector fuel flow (INJ_PW) in milligrams, or mass air flow (MAF), or manifold pressure (MAP). The engine combustion modes comprise a spray-guided spark-ignition (SI-SG) mode, a single injection auto-ignition (HCCI-SI) mode, and double injection auto-ignition (HCCI-DI) mode, and a homogeneous spark-ignition (SI-H) mode. A preferred speed and load operating range for each of the combustion modes is based upon optimum engine operating parameters, including combustion stability, fuel consumption, emissions, engine torque output, and others. Boundaries which define the preferred speed and load operating ranges to delineate the combustion modes are typically determined during pre-production engine calibration and development, and are executed in the engine control module. In operation, the control system monitors the engine speed (RPM) and engine load, and commands operation of the engine into one of the engine combustion modes based thereon, as depicted with reference to FIG. 2. Thus at low speed/load conditions, SI-SG combustion is commanded, whereas in the medium speed/load operating conditions, auto-ignition combustion is commanded.

One known limitation of HCCI engine operation is dependency upon the in-cylinder conditions creating auto-ignition within the combustion chamber. Ringing or combustion noise, characterized by pressure waves of oscillations emanating from the combustion chamber, is a sign that excessive energy is present within the combustion chamber. This energy within the chamber results in the air fuel charge is reaching an auto-ignition point before the intended start of combustion, causing unintended combustion. Ringing limits the high load of HCCI combustion.

A control strategy that extends the high load limit for HCCI operation is disclosed, using injection timing to control in-cylinder conditions in order to reduce combustion noise.

Testing has shown that one method to reduce ringing includes timing fuel injection, such that an end of injection timing is coordinated with an intake period of the combustion cycle. This coordination is selected to maximize heat transfer to the injected fuel in order to reduce energy present in the combustion chamber available to cause auto-ignition and, as described in detail below, to enable an increase in EGR % in the combustion chamber. Injected fuel present during the intake, in contact with high temperature surfaces within the combustion chamber and interacting with the air pulled into the combustion chamber during intake, partially or completely evaporates. One having skill in the art will appreciate that evaporation of a liquid includes a flow of heat from the surroundings into the evaporating liquid without increasing the temperature of the evaporating liquid. This transfer of heat from the combustion chamber environment to the evaporating fuel reduces the overall temperature within the combustion chamber.

Different injection timings result in different interactions between the injected fuel and the air being drawn into the combustion chamber in the intake period. Injection too early results in the injected fuel substantially collecting on the walls of the combustion chamber and failing to interact significantly with the intake air flow. Injection too late does not allow time for the fuel and the air to interact in order to allow the required heat transfer. Additionally, engine load has an impact on this interaction. Testing can be utilized in a particular engine configuration to test resulting heat transfer temperatures and maximize the resulting heat transfer as a function of injection timing for a given engine load.

Figure 4:
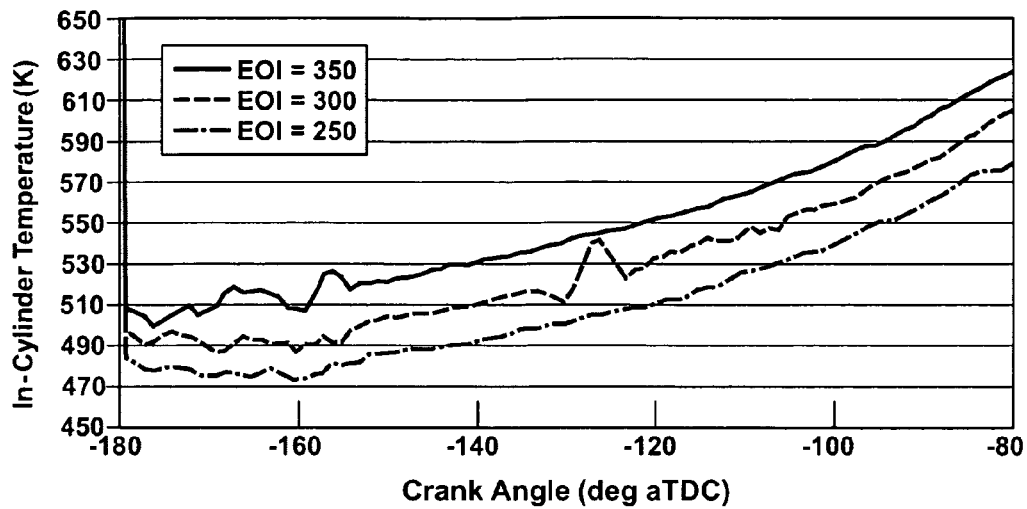
FIG. 4 graphically depicts an exemplary effect of modulating injection timing to in-cylinder temperatures, in accordance with the present disclosure.

FIG. 4 graphically depicts an exemplary effect of modulating injection timing to in-cylinder temperatures, in accordance with the present disclosure. The graph describes data resulting from three different end of injection (EOI) timings: 250 degrees bTDC, 300 degrees bTDC, and 350 degrees bTDC. The combustion cycle utilized in the test includes an opening of the intake valve at approximately 280 degrees bTDC and includes testing at high speeds and moderate load. As is evident in the data, an injection event ending at 350 degrees bTDC or 70 crank angle degrees before the opening of the intake valve is the least effective at reducing in-cylinder temperatures. The other data plots correspond to injection events ending 20 crank angle degrees before and 30 crank angle degrees after the opening of the intake valve. By timing the fuel injection event such that atomized liquid fuel is injected in the time proximate to the opening of the intake valve, the data shows increased cooling of the combustion chamber. This lower temperature lowers the energy present in the combustion chamber available to create auto-ignition, therefore, reducing the occurrence of ringing.

Testing of the exemplary engine configuration showed the above results at high engine speed and moderate engine load. Further testing of the engine utilized showed that as engine load, and therefore the volume of fuel injected into the engine, continued to increase, maximum cooling of the combustion chamber corresponded to increasingly retarded fuel injection timings. At moderate loads, fuel injection occurring proximately to the opening of the intake valve exhibited maximum cooling of the combustion chamber, while at high loads, fuel injection occurring proximately to the peak opening of the intake valve exhibited maximum cooling of the combustion chamber. This relationship can change depending upon the particular configuration of the engine, the combustion chamber, and, in particular, the resulting interaction between the injected fuel and the intake air flow. Testing of a particular engine modulating injection timings and monitoring resulting in-cylinder temperatures at different loads can be performed to illustrate the corresponding relationship for that engine.

Lowering combustion chamber temperature is one way to avoid auto-ignition of the air fuel charge. However, the risk of ringing does is not limited to conditions determinable at a time before the initiation of combustion. Either by spark ignition or by auto-ignition, combustion, once started, is a process that takes time to combust or burn the entire charge within the chamber. Ringing can occur after the start of combustion within the portion of the charge yet to be combusted. The intended combustion process can itself contribute to the occurrence of ringing. Combustion within the chamber creates pressure waves within the chamber. Increased pressure in a portion of the charge resulting from a pressure wave created by the intended combustion event can increase the energy present within the charge to the point of combustion, thereby causing ringing. One method to reduce the effect of the intended combustion process upon the remaining charge yet to be combusted is to increase the time span over which combustion occurs. By stretching out the time of combustion, the effect of the resulting pressure waves is reduced, thereby reducing the occurrence of ringing.

Figure 3:
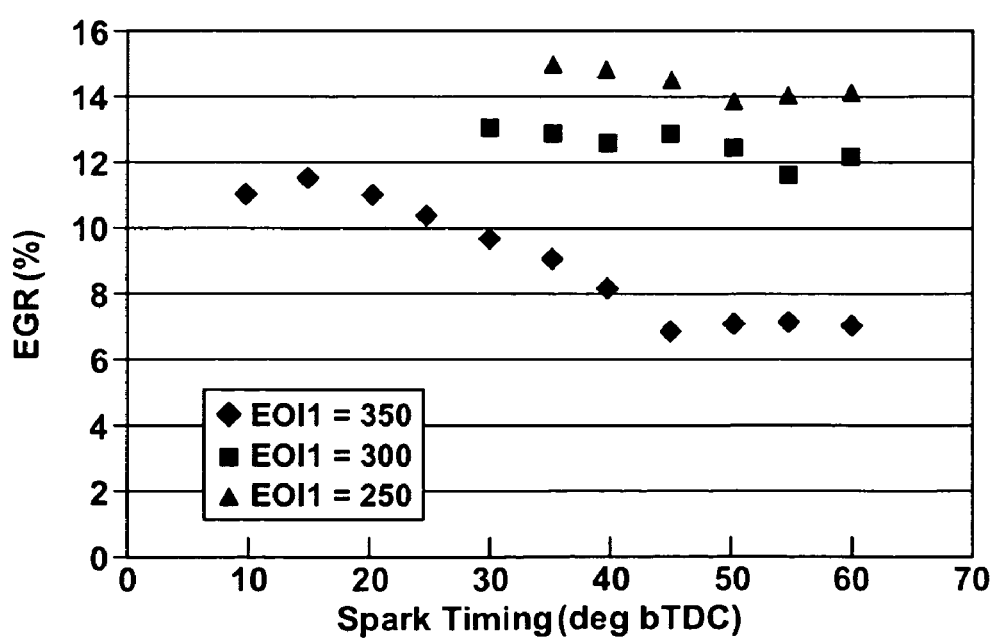
FIG. 3 graphically depicts exemplary test data for an engine in HCCI operation, with different injection timings and EGR percentages, in accordance with the present disclosure.

One having skill in the art will appreciate that lower charge temperatures resulting from evaporation of the injected fuel result in greater charge density. This greater density of the charge allows for additional material to brought into the combustion chamber during combustion, for example, by increasing an EGR %. Exhaust gas present in the combustion chamber due to EGR is an inert substance. FIG. 3 graphically depicts exemplary test data for an engine in HCCI operation, with different injection timings and EGR percentages, in accordance with the present disclosure. The test results correspond to the testing described in FIG. 4. This exemplary relationship shows that injection timings exhibiting increased combustion chamber cooling, EOIs 250 degrees bTDC and 300 degrees bTDC, allow increased external residuals to be brought into the cylinder. This increased EGR % increases charge dilution, slowing a chemical reaction rate and extending the duration of the combustion process, thereby slowing the combustion process and further reducing the occurrence of ringing.

Figure 6:
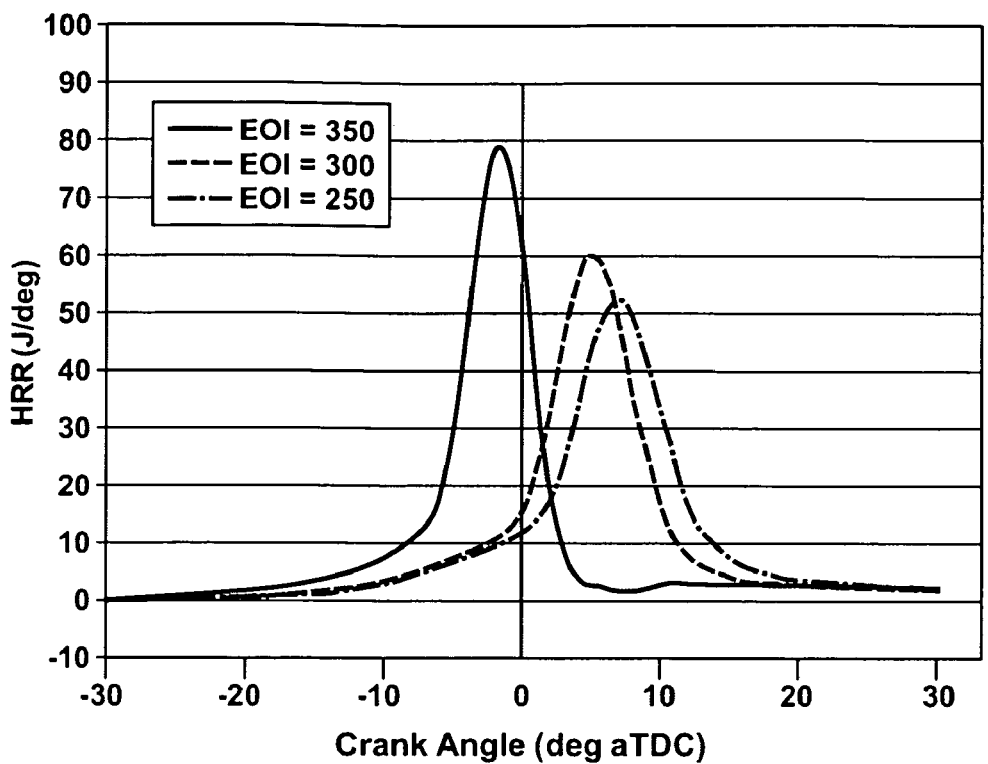
FIG. 6 graphically depicts an exemplary effect of modulating fuel injection timing on a heat release rate of combustion, in accordance with the present disclosure.

FIG. 6 graphically depicts an exemplary effect of modulating fuel injection timing on a heat release rate of combustion, in accordance with the present disclosure. The test results were collected on in an exemplary system utilizing a fixed spark timing. Heat release rate (HRR) is a description of how much energy is released in the combustion process per crank angle degree. Higher values of HRR correspond to combustion events creating higher energy conditions within the combustion chamber. For example, a robust combustion event occurring over a short period of time includes a percussive pressure wave as opposed to a smaller wave or series of waves associated with a more gradual combustion event. As described above, increased density allowing greater EGR % dilutes the combustion charge and increases the duration of the combustion event. As is evident in the results of FIG. 6, controlling the rate of energy release by controlling the combustion process results in more controlled release of energy within the combustion chamber.

Figure 5:
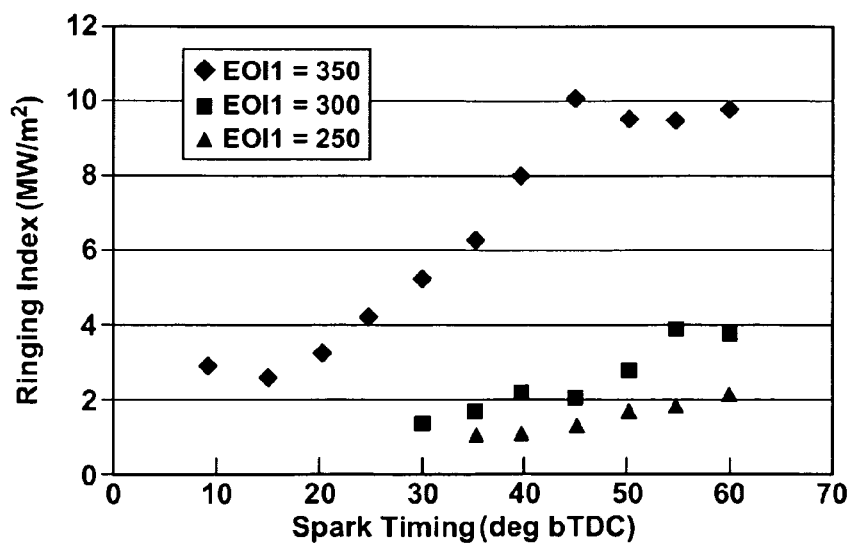
FIG. 5 graphically depicts an exemplary effect of modulating fuel injection timing on a ringing index or an indication of the occurrence of ringing for tests corresponding to the exemplary engine tested above, in accordance with the present disclosure.

FIG. 5 graphically depicts an exemplary effect of modulating fuel injection timing on a ringing index or an indication of the occurrence of ringing for tests corresponding to the exemplary engine tested above, in accordance with the present disclosure. As described above, injection timing calibratably coordinated with the intake period cools the combustion chamber and allows for greater EGR % resulting in extending the duration of the combustion process. The results depicted show a significant decrease in the occurrence of ringing in the given test results corresponding to selected fuel injection timings.

Increasing density of the air fuel charge in order to utilize a greater EGR % is effective to spread out or increase the duration of the intended combustion event in order to reduce ringing. However, one having skill in the art will appreciate that modulating fuel injection timing affects other properties of combustion, for example, combustion phasing. Combustion phasing describes the progression of combustion in a cycle as measured by the crank angle of the cycle. The effect of injection timing upon combustion phasing depends upon the resulting conditions within the combustion chamber. For example, earlier injection can cause combustion to start earlier, thereby advancing combustion phasing; or earlier injection enabling greater EGR % can delay and spread out combustion, thereby retarding combustion phasing. One convenient metric to judge combustion phasing is CA50 or the crank angle at which 50% of the air fuel charge is combusted. One will appreciate that properties of a combustion cycle, such as efficiency, are affected by CA50 of the cycle. However, other factors such as spark timing affect CA50. A method to employ modulated injection timing to reduce ringing while modulating spark timing to maintain a preferred combustion timing is disclosed.

Figure 7:
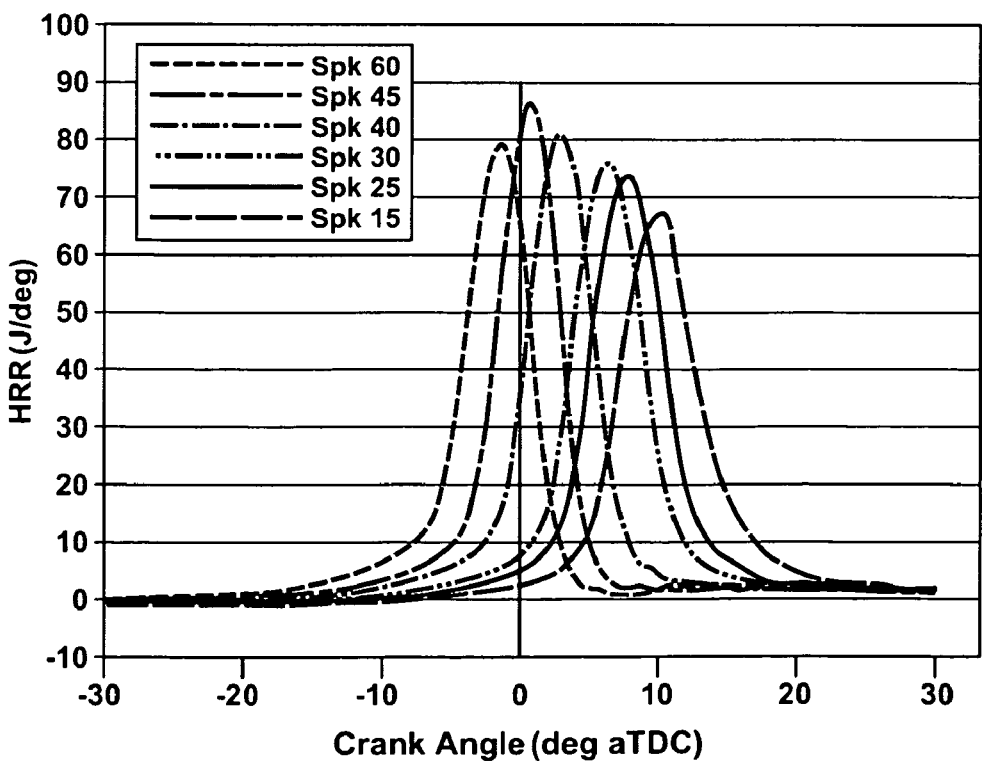
FIG. 7 graphically depicts an exemplary effect of spark timing upon combustion phasing, in accordance with the present disclosure.

FIG. 7 graphically depicts an exemplary effect of spark timing upon combustion phasing, in accordance with the present disclosure. Plots for six different spark timings are depicted. As is evident in FIG. 7, earlier spark timings result in profiles of HRR peaking earlier in the combustion cycle. In this way, spark timing can be utilized to modulate resulting combustion phasing.

Spark-assisted ignition of HCCI combustion includes utilizing a spark to create combustion within the combustion chamber of an air fuel charge not yet at an energy level conducive to auto-ignition. The spark induced combustion creates a release of energy within the combustion chamber including a pressure wave. This energy release propagates to the remainder of the combustion chamber and facilitates the remainder of the air fuel charge to achieve auto-ignition. While HCCI mode ideally operates without spark ignition, circumstances are known wherein spark-assisted HCCI operation is useful. For example, in cold start or low speed and low load conditions, spark-assisted HCCI utilizes the energy release from the spark ignition to facilitate auto-ignition of the charge in a region wherein auto-ignition might be unstable or not possible. In the present circumstances to enable HCCI operation at higher loads, spark-assisted ignition can be used to begin combustion of the charge before auto-ignition is expected to begin, thereby allowing control of combustion phasing through modulation of the spark timing. Testing has shown that, when such selection is possible according to injection timing, resulting CA50, and other related parameters, selection of advanced spark timing can facilitate combustion of 20% of the air fuel charge in advance of the initiation of auto-ignition.

Figure 9:
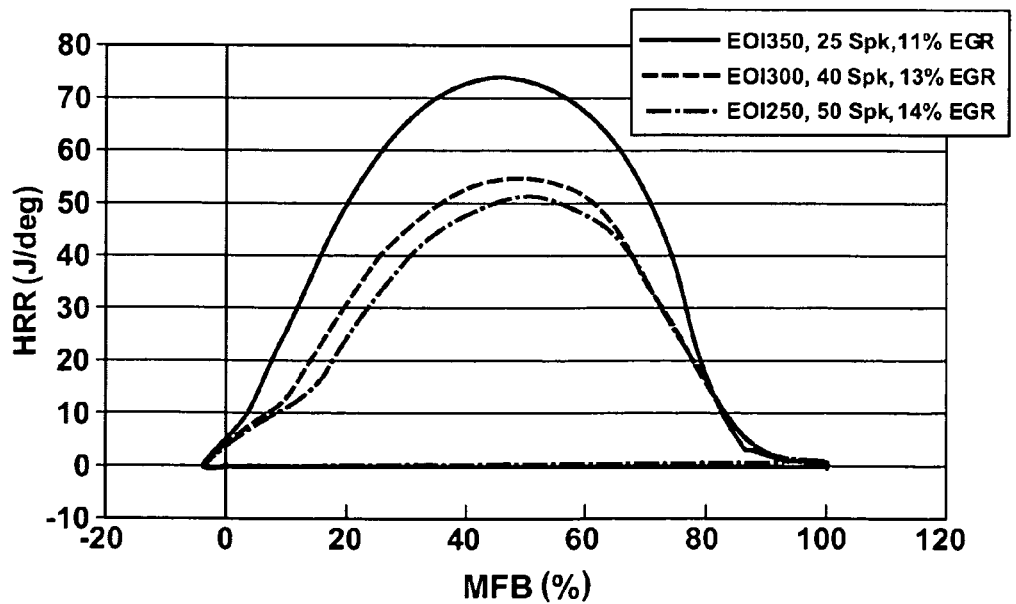
FIG. 9 graphically depicts three different exemplary control configurations resulting in the same CA50 value, in accordance with the present disclosure.

Fuel injection timing selected according to maximum charge or combustion chamber cooling can be utilized to reduce temperatures within the combustion chamber and, additionally, provide for greater EGR %, and spark timing can be adjusted to compensate for preferred combustion phasing. FIG. 9 graphically depicts three different exemplary control configurations resulting in the same CA50 value, in accordance with the present disclosure. Three plots are depicted, plotting HRR against mass fraction burn or the percentage of air fuel charge combusted, representing a first control configuration comprising an end of injection at 350 degrees bTDC, a spark timing of 25 degrees bTDC, and an EGR % of 11%; a second control configuration comprising an end of injection at 300 degrees bTDC, a spark timing of 40 degrees bTDC, and an EGR % of 13%; and a third control configuration comprising an end of injection at 250 degrees bTDC, a spark timing of 50 degrees bTDC, and an EGR % of 14%. All three plots describe a combustion cycle with CA50 at 8 degrees a TDC. As is evident in the plots, the resulting HRR of combustion can be lowered by modulating the fuel injection timing, and combustion phasing can be maintained at the preferred CA50 value by modulating spark timing.

Spark timing can be modulated to enable modulated fuel injection timing, while controlling resulting combustion phasing, according to the method described above. Additionally, testing has shown that spark-assisted ignition timed before the start of auto-ignition can further aid spreading out the duration of combustion and resulting heat release by combusting a portion of the air fuel charge in advance of auto-ignition. Because the ignition of the air fuel charge is spread between the spark-assisted ignition and the resulting HCCI combustion, the pressure waves created by combustion are smaller in magnitude than the percussive, burst of heat release associated with a single auto-ignition event. In this way, utilizing spark-assisted HCCI operation, including an advanced spark timing configured to initiate combustion before an expected start of auto-ignition can be used to reduce the occurrence of ringing.

Figure 8:
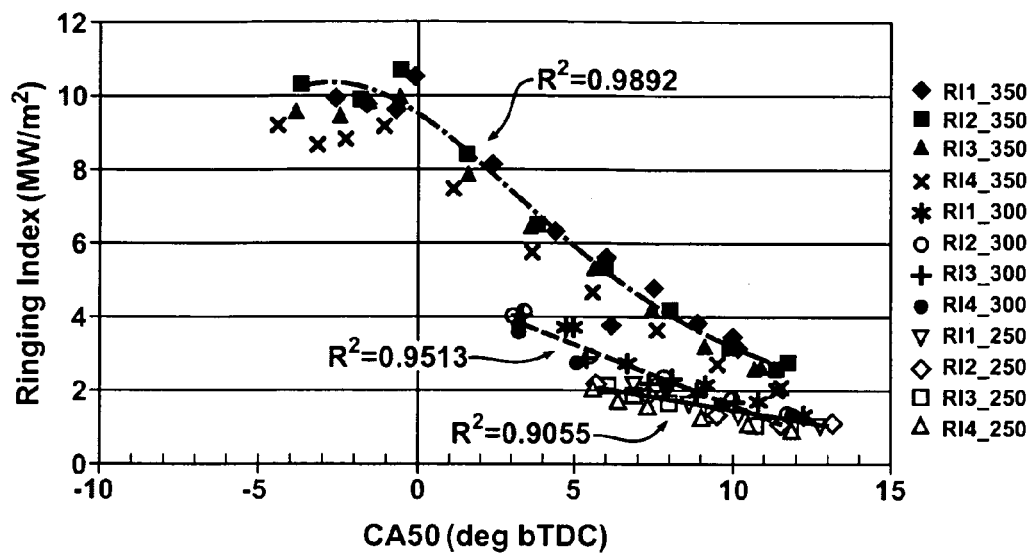
FIG. 8 graphically illustrates exemplary effects of different spark timings and fuel injection timings upon ringing, in accordance with the present disclosure.

Modulating fuel injection timing and spark timing can have a cooperative effect upon the occurrence of ringing. FIG. 8 graphically illustrates exemplary effects of different spark timings and fuel injection timings upon ringing, in accordance with the present disclosure. Three injection timings are depicted and demonstrate effects to ringing based upon resulting combustion phasing values. As is evident in the data, ringing can be reduced by selection of injection timings, and for each selected injection timing, ringing can be reduced by modulating resulting combustion phasing, for example, by modulation of spark timing. Use of such calibration data can be used to select operating points, for example, minimizing ringing versus effects to CA50 and resulting properties such as efficiency, for example, by selecting a desired spark timing based upon a balancing of the other terms. In such a balancing, the engine is then operated according to the desired spark timing, and other factors such as injection timing and resulting CA50 change according to the balancing. One will appreciate that the test results depicted are specific to the engine configuration tested, and that testing of the particular engine configuration being calibrated must be used to predict similar behavior.

Figure 10:
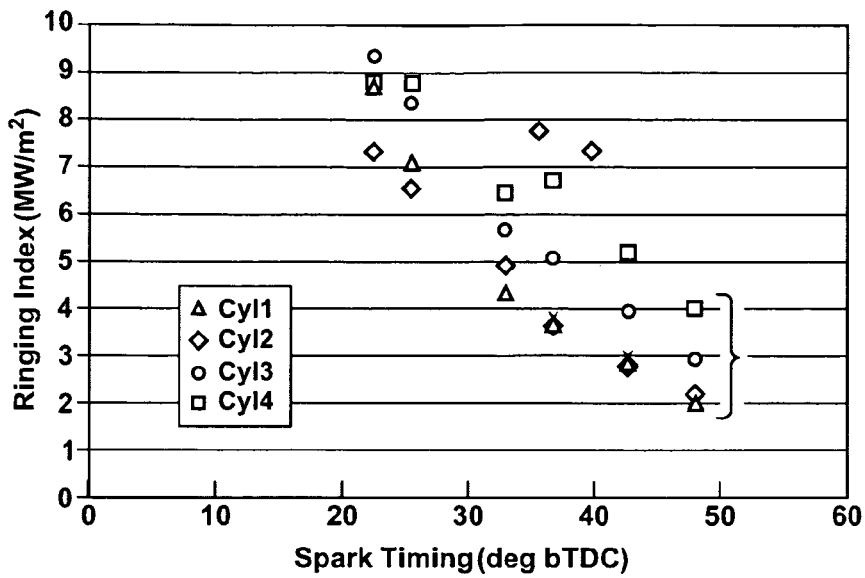
FIG. 10 graphically depicts exemplary operation of four cylinders through a range of spark timing values, in accordance with the present disclosure.
Figure 11:
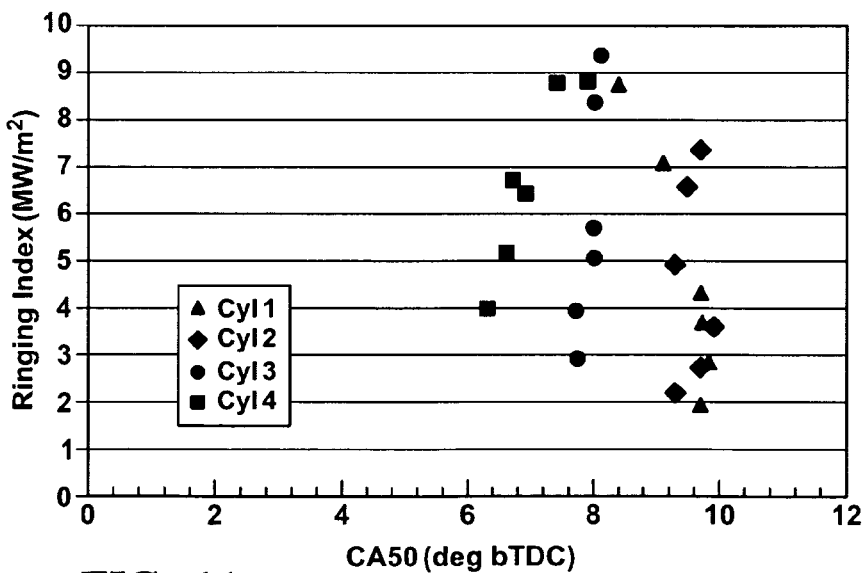
FIG. 11 graphically depicts resulting combustion phasing for the test results of FIG. 10 for each of the four cylinders, in accordance with the present disclosure.

Engines frequently employ multiple cylinders. Each cylinder can operate differently due to different operating conditions, for example, with different cylinders having non-uniform distribution of EGR or different heat transfer properties resulting in different thermal environments. FIG. 10 graphically depicts exemplary operation of four cylinders through a range of spark timing values, in accordance with the present disclosure. As is evident in the test data, different cylinders of the same engine exhibit different ringing properties for the same spark timing. FIG. 11 graphically depicts resulting combustion phasing for the test results of FIG. 10 for each of the four cylinders, in accordance with the present disclosure. The results depicted in FIG. 11 reinforce the principle that different conditions within different cylinders cause variation in the resulting operation, including ringing properties, of the different cylinders. The cylinder with the retarded CA50 shows the lowest ringing. Similar results describing a cylinder specific status of the cylinder, quantifiable, for example, by a change in CA50 from a preferred CA50, can be used in combination with information such as contained within FIG. 8 to adjust properties of the cylinder, such as spark timing and fuel injection timing, to bring the cylinder closer to desired operation. By adopting individual control strategies for each cylinder, predicted CA50 properties for each cylinder can be balanced using individual spark timing control, for example, by controlling each cylinder to a preferred CA50, and the average ringing index can be further reduced.

Figure 12:
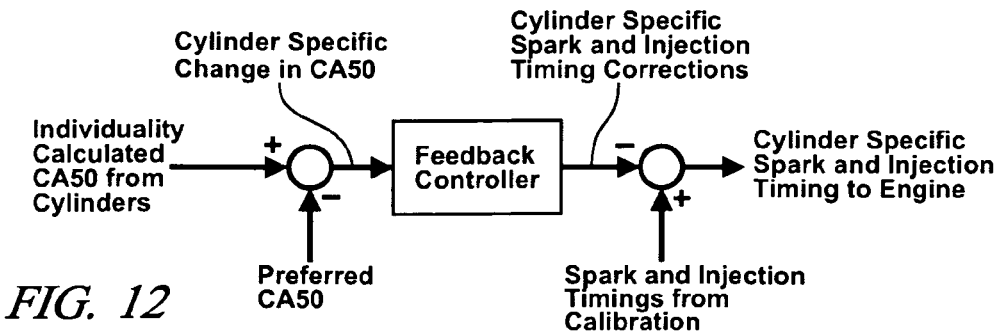
FIG. 12 schematically depicts an exemplary system for individual CA50 control utilizing spark timing control, in accordance with the present disclosure.

FIG. 12 schematically depicts an exemplary system for individual CA50 control utilizing spark timing control, in accordance with the present disclosure. The system disclosed utilizes a feedback controller to coordinate a preferred CA50, the preferred CA50 value including injection timing and spark timing desired in order to facilitate HCCI operation at high speed and moderate to high load, with timings from each individual cylinder to resulting spark and injection timings required to compensate for cylinder to cylinder variation in operation. Inputs related to individually calculated CA50 from each cylinder are compared to a preferred CA50 according to a presently selected mode of operation, establishing a cylinder specific change in CA50. This cylinder specific change in CA50 describes a net change in the operating conditions for that cylinder resulting in a change in CA50 and resulting ringing properties. Calibrated information, such as the data depicted in FIG. 8, can be utilized by the feedback controller to determine cylinder specific spark and injection timing corrections in order to maintain operation with low ringing across all of the cylinders. These cylinder specific spark and injection timing corrections are then combined with calibrated spark and injection timings corresponding to desired engine operation to form cylinder specific spark and injection timing commands to the engine. In this way, cylinder to cylinder variation in engine operation can be corrected according to methods described herein to reducing ringing.

Figure 13:
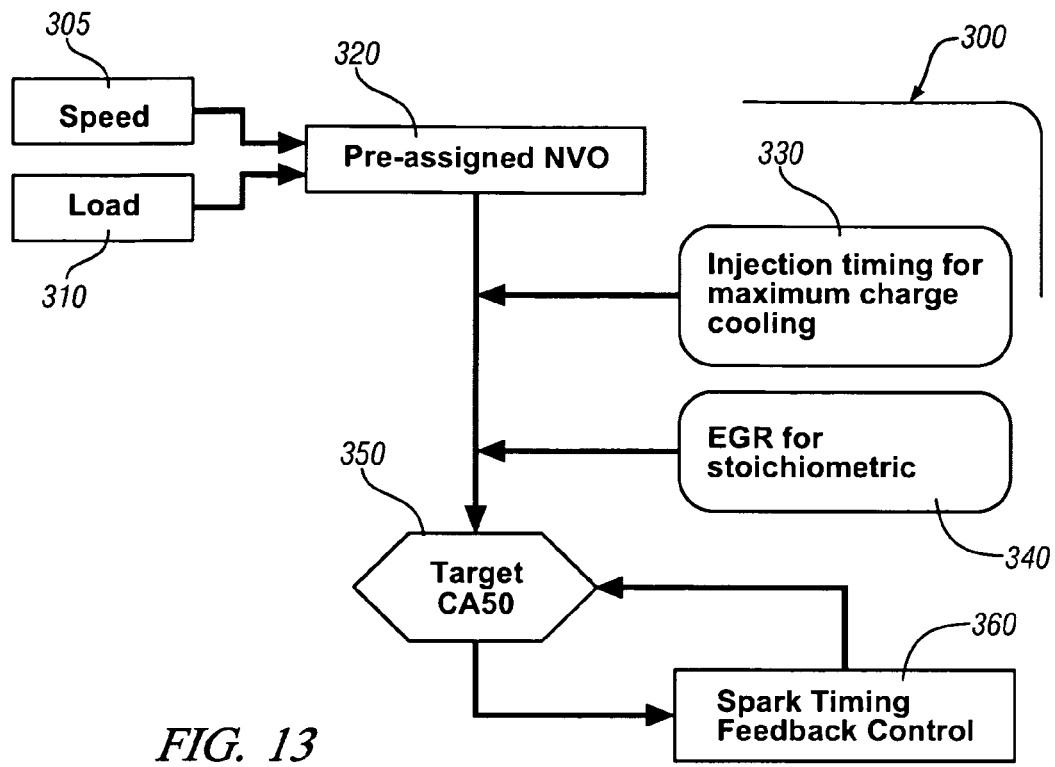
FIG. 13 depicts an exemplary process for implementing methods described herein, in accordance with the present disclosure.

FIG. 13 depicts an exemplary process for implementing methods described herein, in accordance with the present disclosure. When the control system monitoring engine speed and engine load determines that the engine can operate in HCCI mode in a high ringing range corresponding to high engine speed and load, determinable for instance through engine calibration or modeling, process 300 can be employed to reduce corresponding ringing. Process 300 describes a reduced ringing mode and comprises steps 305 and 310 monitoring engine speed and engine load; step 320 determining a pre-assigned or calibrated NVO based upon the monitored engine speed and load according to methods known in the art; step 330 applying a calibrated injection timing for maximum charge or combustion chamber cooling in accordance with methods disclosed herein; step 340 determining an EGR % for stoichiometric combustion; step 350 determining a target or preferred CA50 based upon metrics determined in previous steps and predicted resulting combustion efficiency; and step 360 determining a spark timing through feedback control in order to achieve the preferred CA50.

Figure 14:
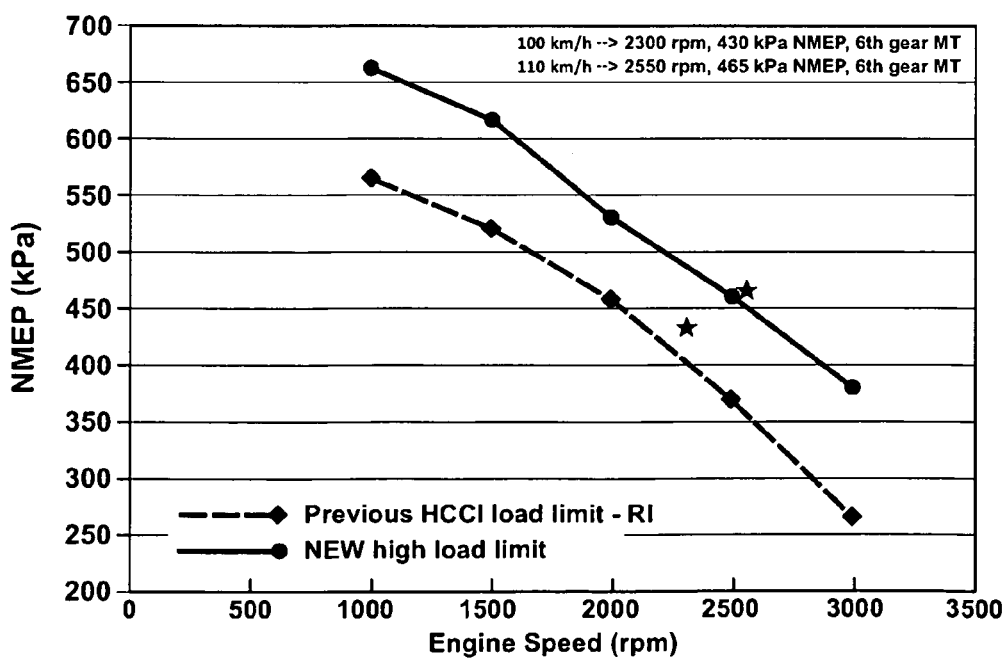
FIG. 14 graphically depicts test results illustrating improved operation in HCCI mode enabled by combustion chamber cooling and related methods described herein, in accordance with the present disclosure.

Resulting increases in the engine to operate at higher loads in HCCI modes will vary from engine to engine and will depend upon factors utilized to select operative parameter such as preferred CA50. However, in an exemplary test configuration, an engine exhibited an increased range of HCCI capable operation of 73 kPa NMEP at 2000 rpm, from an old maximum of kPa 458 NMEP to 531 kPa NMEP. FIG. 14 graphically depicts test results illustrating improved operation in HCCI mode enabled by combustion chamber cooling and related methods described herein, in accordance with the present disclosure. The previous HCCI load limit demonstrates an exemplary high ringing range, wherein absent the presently disclosed methods, ringing limits operation in HCCI mode. As is evident in the plots, the improved HCCI load limit is improved for every engine speed, thereby enabling fuel efficiency and HCCI related benefits through a greater range of engine operation.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling an internal combustion engine capable of operating in a homogeneous charge compression ignition mode, including extended operation in the homogeneous charge compression ignition mode at high loads by reducing occurrence of ringing within the engine, said method comprising:
   operating the engine in the homogeneous charge compression ignition mode including spark-assisted ignition;
   monitoring an engine load;
   monitoring an engine speed;
   determining when the engine is in a high ringing range based upon the engine load and the engine speed; and
   when the engine load is in the high ringing range, operating the engine in a reduced ringing mode, comprising
      modulating a fuel injection timing during an intake stroke according to a calibrated maximum combustion chamber cooling fuel injection timing, said modulated fuel injection timing selected to maximize heat transfer to the injected fuel reducing energy within the combustion chamber available for homogeneous charge compression ignition,
      determining a preferred combustion phasing value, and
      modulating a spark timing to maintain the preferred combustion phasing value, the modulated spark timing based upon the modulated fuel injection timing and the preferred combustion phasing value.

2. The method of claim 1, wherein operating the engine in the reduced ringing mode further comprises:
   determining a predicted increase in an air fuel charge density based upon the modulated fuel injection timing during the intake stroke; and increasing an exhaust gas recirculation percentage based upon the predicted increase in the air fuel charge density.

3. The method of claim 1, wherein operating the engine in the reduced ringing mode further comprises:
predicting an auto-ignition timing based upon the engine load and the engine speed; and
utilizing a spark timing before the predicted auto-ignition timing, wherein the spark timing is selected to combust a portion of a air fuel charge before the predicted auto-ignition timing.

4. The method of claim 1, wherein operating the engine in the reduced ringing mode further comprises:
modulating for each cylinder of the engine a cylinder specific fuel injection timing during an intake stroke according to a cylinder specific calibrated maximum combustion chamber cooling fuel injection timing; and
modulating for each cylinder of the engine a cylinder specific spark timing based upon the cylinder specific fuel injection timing during the intake stroke and the preferred combustion phasing value.

5. The method of claim 1, wherein the calibrated maximum combustion chamber cooling fuel injection timing comprises:
when the engine load is in a medium range, a timing selected in relation to an opening of an intake valve; and
when the engine load is a high range, a timing selected in relation to an intake valve peak opening.

6. The method of claim 1, further comprising:
monitoring a predicted timing of auto-ignition; and
wherein modulating the spark timing is further based upon moving the spark timing being before the predicted timing of auto-ignition.

7. Method for controlling an internal combustion engine operable in a homogeneous charge compression ignition mode, including operation in a high ringing range, the method comprising:
monitoring an engine speed;
monitoring an engine load;
monitoring a preferred combustion phasing value;
determining a pre-assigned negative valve overlap based upon the engine speed and the engine load;
determining a maximum combustion chamber cooling fuel injection timing based upon the engine load, the fuel injection timing modulated during an intake stroke and the fuel injection timing selected to maximize heat transfer to the injected fuel reducing energy within the combustion chamber available for homogeneous charge compression ignition;
determining a desired exhaust gas recirculation percentage based upon the maximum combustion chamber cooling fuel injection timing;
determining a desired spark timing to maintain the preferred combustion phasing value, the modulated spark timing based upon balancing the preferred combustion phasing value and the maximum combustion chamber cooling fuel injection timing; and
operating the engine based upon the desired spark timing.

8. The method of claim 7, wherein the preferred combustion phasing value is based upon maximizing a predicted combustion efficiency at the engine speed and the engine load.

9. Internal combustion engine system, comprising:
an internal combustion engine, configured for selective operation in a homogeneous charge compression ignition combustion mode;
a control module configured to monitor engine operating states and control engine operation; and
an engine control subsystem configured to control engine operation based upon the monitored engine operating states, comprising
operating the engine in the homogeneous charge compression ignition mode including spark-assisted ignition,
monitoring an engine load,
monitoring an engine speed,
determining the engine to be in a high ringing range based upon the engine load and the engine speed, and
when the engine load is in the high ringing range, operating the engine in a reduced ringing mode comprising
modulating a fuel injection timing during an intake stroke according to a calibrated maximum combustion chamber cooling fuel injection timing, said modulated fuel injection timing selected to maximize heat transfer to the injected fuel reducing energy within the combustion chamber available for homogeneous charge compression ignition;
determining a preferred combustion phasing value, and
modulating a spark timing to maintain the preferred combustion phasing value, the modulated spark timing based upon the modulated fuel injection timing and the preferred combustion phasing value.

10. The system of claim 9, wherein operating the engine in the reduced ringing mode further comprises:
determining a predicted increase in air fuel charge density based upon the modulated fuel injection timing during the intake stroke; and
increasing an exhaust gas recirculation percentage based upon the predicted increase in air fuel charge density.

11. The system of claim 9, wherein operating the engine in the reduced ringing mode further comprises:
predicting an auto-ignition timing based upon the engine load and the engine speed; and
utilizing a spark timing before said predicted auto-ignition timing, wherein the spark timing is selected to combust a portion of a air fuel charge before the predicted auto-ignition timing.

12. The system of claim 9, wherein operating the engine in the reduced ringing mode further comprises:
modulating for each cylinder of the engine a cylinder specific fuel injection timing during an intake stroke according to a cylinder specific calibrated maximum combustion chamber cooling fuel injection timing; and
modulating for each cylinder of the engine a cylinder specific spark timing based upon cylinder specific fuel injection timing and the preferred combustion phasing value.

13. The system of claim 9, wherein the calibrated maximum combustion chamber cooling fuel injection timing comprises:
when the engine load is in a medium range, a timing selected in relation to an opening of an intake valve; and
when the engine load is a high range, a timing selected in relation to an intake valve peak opening.

14. The system of claim 9, wherein the engine control subsystem configured to control engine operation based upon the monitored engine operating states further comprises:
monitoring a predicted timing of auto-ignition; and
wherein modulating the spark timing is further based upon moving the spark timing being before the predicted timing of auto-ignition.

* * * * *